(12) United States Patent
Otoshi (10) Patent No.: US 12,314,153 B2
(45) Date of Patent: May 27, 2025

(54) INFORMATION PROCESSING DEVICE, NON-TRANSITORY COMPUTER READABLE MEDIUM, AND INFORMATION PROCESSING SYSTEM

(71) Applicant: FIXSTARS CORPORATION, Tokyo (JP)

(72) Inventor: Hajime Otoshi, Tokyo (JP)

(73) Assignee: FIXSTARS CORPORATION, Tokyo (JP)

( * ) Notice: Subject to any disclaimer, the term of this patent is extended or adjusted under 35 U.S.C. 154(b) by 37 days.

(21) Appl. No.: 18/108,864

(22) Filed: Feb. 13, 2023

(65) Prior Publication Data

US 2023/0195595 A1   Jun. 22, 2023

Related U.S. Application Data

(63) Continuation of application No. PCT/JP2021/029779, filed on Aug. 12, 2021.

(30) Foreign Application Priority Data

Aug. 13, 2020   (JP) .................................. 2020-136843
Feb. 24, 2021   (JP) .................................. 2021-027754

(51) Int. Cl.
*G06N 5/04*   (2023.01)
*G06F 8/51*   (2018.01)
(Continued)

(52) U.S. Cl.
CPC ............ *G06F 11/3608* (2013.01); *G06F 8/51* (2013.01)

(58) Field of Classification Search
CPC .......... G06F 11/3608; G06F 8/51; G06F 8/72; G06F 8/37; G06F 8/427; G06F 8/751;
(Continued)

(56) References Cited

U.S. PATENT DOCUMENTS 7,761,425 B1 *   7/2010   Erickson ............. G06F 11/1464
                                                                707/649
10,467,547 B1 *  11/2019   Range .................... G06N 20/00
(Continued)

FOREIGN PATENT DOCUMENTS

JP   2003029978 A   1/2003
JP   2006018693 A   1/2006
(Continued)

OTHER PUBLICATIONS

Higo, Y. et al. "A Survey Code Clone Detection and its Related Techniques." Proceedings of IEICE, vol. J91-D, No. 6, Jun. 1, 2008, pp. 1465-1481.
(Continued)

*Primary Examiner* — Thuy Dao
(74) *Attorney, Agent, or Firm* — WTA Patents (57) ABSTRACT

An information processing device includes one or more processors. The one or more processors are configured to divide targets into a plurality of units for each predetermined identifier, define a set of a first predetermined number of said units as a sub-block from each of the units for the plurality
(Continued)

of units; encode the sub-block by predetermined conversion, and obtain a code; and use the code as a key, and detect existence of another sub-block having identical content with the sub-block corresponding to the code when duplication of the key is detected.

20 Claims, 10 Drawing Sheets

(51) Int. Cl.
*G06F 9/445* (2018.01)
*G06F 9/455* (2018.01)
*G06F 11/3604* (2025.01)
*G06F 16/21* (2019.01)
*G06F 16/35* (2025.01)
*G06N 20/00* (2019.01)

(58) Field of Classification Search
CPC .... G06F 16/322; G06F 18/214; G06F 40/237; G06F 40/284; G06F 16/3344; G06F 40/56; G06F 40/216; G06F 40/30; G06F 40/44; G06N 20/00; G06N 5/022; G06N 3/08
See application file for complete search history.

(56) References Cited

U.S. PATENT DOCUMENTS

| | | | |
|---|---|---|---|
| 12,033,612 B2* | 7/2024 | Zheng | G10L 19/04 |
| 2013/0212553 A1* | 8/2013 | Balasubramanian | G06Q 10/06 717/102 |
| 2018/0246717 A1* | 8/2018 | Martin | H04L 9/0643 |

FOREIGN PATENT DOCUMENTS

| | | |
|---|---|---|
| JP | 2016184323 A | 10/2016 |
| WO | WO 2016/189721 A1 | 12/2016 |

OTHER PUBLICATIONS

PCT International Search Report and Written Opinion, PCT Application No. PCT/JP2021/029779, Nov. 2, 2021, 14 pages.
PMD. "PMD Release Notes." PMD Source Code Analyzer Project, PMD 6.26.0, Jul. 25, 2020, 4 pages, [Online] [Retrieved Feb. 13, 2023], Retrieved from the Internet <URL:https://pmd.sourceforge.io/pmd-6.26.0/pmd_release_notes.html>.
PCT International Preliminary Report on Patentability, PCT Application No. PCT/JP2021/029779, Feb. 23, 2023, six pages.

* cited by examiner

```
{
    int a =0;
    int b = 1;
    param *p = 0;

SET_PARAM01('xxx', p, a, b);
    func01(p);    func01(p);
      :
    p = 0;
}
{
    float a =0.0;
    float b = 1.0;

func02(&a, &b);
      :
}
{
    int a =0;
    int b = 1;
    param *p = 0;

SET_PARAM03('zzz', p, a, b);
    func03(p);    func03(p);
      :
    p = 0;
}
```

```
left_curl,
raw_identifier,raw_identifier,equal,numeric_constant,semi
raw_identifier,raw_identifier,equal,numeric_constant,semi
raw_identifier,astarisc,raw_identifier,equal,numeric_constant,semi
blank
macro,left_paren,ascii_constant,comma,raw_identifier,comma,raw_identifier,comma,raw_identifier,right_paren,semi
function,left_paren,raw_identifier,right_paren,semi,function,left_paren,raw_identifier,right_paren,semi
;
raw_identifier,equal,numeric_constant,
right_curl
left_curl
raw_identifier,raw_identifier,numeric_constant,semi
raw_identifier,raw_identifier,numeric_constant,semi
blank
function,left_paren,ampersand,raw_identifier,ampersand,raw_identifier,right_paren,semi
;
right_curl
left_curl
raw_identifier,raw_identifier,equal,numeric_constant,semi
raw_identifier,raw_identifier,equal,numeric_constant,semi
raw_identifier,astarisc,raw_identifier,equal,numeric_constant,semi
blank
macro,left_paren,ascii_constant,comma,raw_identifier,comma,raw_identifier,comma,raw_identifier,right_paren,semi
function,left_paren,raw_identifier,right_paren,semi,function,left_paren,raw_identifier,right_paren,semi
;
raw_identifier,equal,numeric_constant,semi
right_curl
```

FIRST SOURCE CODE
```
1  int a2 = 2;
2  int a3 = 3;
3  printf("\n");
4  int a4 = 4;
5  int a5 = 5;
6  float b = 1.5;
   ⋮
```

SECOND SOURCE CODE
```
1  int a1 = 1;
2  int a2 = 2;
3  int a3 = 3;
4  int a4 = 4;
5  int a5 = 5;
6  ⋮
```

INFORMATION PROCESSING DEVICE, NON-TRANSITORY COMPUTER READABLE MEDIUM, AND INFORMATION PROCESSING SYSTEM

CROSS REFERENCE TO RELATED APPLICATIONS

This application is bypass continuation application of International Application No. JP2021/029779, filed on Aug. 12, 2021, which claims priority to Japanese Patent Application No. 2020-136843, filed on Aug. 13, 2020 and Japanese Patent Application No. 2021-027754, filed on Feb. 24, 2021, the entire contents of which are incorporated herein by reference.

FIELD

The present disclosure relates to an information processing device, a non-transitory computer readable medium, and an information processing system.

BACKGROUND

In various projects, performing refactoring of a source code is currently widely performed. At present, the refactoring is executed by extracting a portion that can be a target of modification by manual in many cases and correcting the portion. Such a refactoring method has a problem that the labor cost increases. In order to cope with such a situation, a portion described by copy and paste, which is a portion that can be a target of modification in the source code, is automatically extracted. However, since such a search requires $O(n^2)$ processing and time, automatic extraction is practically difficult in a large project.

Furthermore, in a case where a common logic or the like is used for the source code, there is a case where there are blocks of codes similar to each other at different portions. Such blocks can be subject to refactoring, but are often difficult to refactor. In such a case, there may be some similar code blocks in the source code. In similar code blocks, it may be desirable to perform the same correction in addition or modification of functions, but it is often difficult or expensive to extract such target code blocks by manual.

DETAILED DESCRIPTION

According to one embodiment, an information processing device includes one or more processors. The one or more processors are configured to divide targets into a plurality of units for each predetermined identifier: define a set of a first predetermined number of said units as a sub-block from each of the units for the plurality of units: encode the sub-block by predetermined conversion, and obtain a code; and use the code as a key, and detect existence of another sub-block having identical content with the sub-block corresponding to the code when duplication of the key is detected.

According to another embodiment, each of the processors detects, in a first source code that is one of the targets, a second code block that is a clone pair having identical content with a first code block at a predetermined ratio or more, extracts a third code block corresponding to the first code block in a second source code that is another target edited earlier than the first source code, and detects a possibility of omission of correction in the second code block when the first code block is corrected with respect to the third code block.

Embodiments of the present disclosure will be described with reference to the drawings. Note that, in the drawings and the description, only the configuration as an example of an embodiment is shown, and it does not limit the absence of other components. For example, various components for operating a computer are omitted. Furthermore, in the description of the embodiment, although there is a description of being larger (greater) below, which of boundary values is included is not essential, and each of the boundary values is appropriately read as less than or more than or equal to the boundary value. The same applies to the claims.

Figure 1:
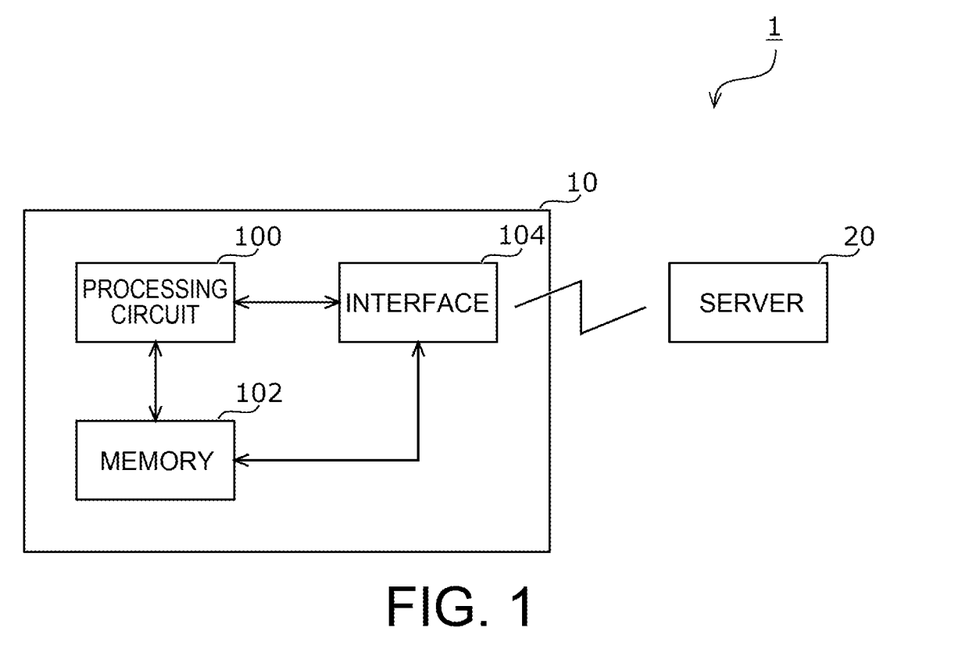
FIG. 1 is a block diagram schematically illustrating an information processing device according to an embodiment.

FIG. 1 is a diagram schematically illustrating a configuration of an information processing system according to an embodiment. An information processing system 1 includes an information processing device 10 and a server 20.

The information processing device 10 includes a processing circuit 100, a memory 102, and an interface 104. The information processing device 10 is, for example, a computer (client) that can be directly or indirectly controlled by a user. This computer is connected to the server 20 via a network such as the Internet, for example.

The processing circuit 100 executes various processing in the information processing device 10. The processing circuit 100 is, for example, a central processing unit (CPU), and may be a circuit that performs general-purpose processing. Furthermore, it may be an accelerator such as a graphics processing unit (GPU), or may be a circuit that executes computation on the basis of a request from the CPU. The processing circuit 100 may have the configuration described in the above example, or may be an analog circuit or a digital circuit capable of realizing processing described below. The configuration may include, for example, an application specific integrated circuit (ASIC), a field programmable gate array (FPGA), or the like.

The memory 102 stores data necessary for executing an operation of the information processing device 10 or data of an operation result. The memory 102 may include, for example, a dynamic random access memory (DRAM), a magnetoresistive random access memory (MRAM), or the like, or may be partially configured by a read only memory (ROM).

For example, an operation of the processing circuit 100 may be such that information processing by software is specifically realized using hardware resources (the processing circuit 100, the memory 102, and the like). In this case, information such as a program for executing information processing is stored in the memory 102, and the processing circuit 100 reads the program stored in the memory 102, whereby the information processing may be realized by the processing circuit 100.

The interface 104 is an interface that connects the information processing device 10 and the outside. The interface 104 includes, for example, a network interface, and realizes communication with the server 20 via the network interface. Furthermore, although not illustrated, the interface 104 is connected to an input device such as a mouse and a keyboard, and an output device such as a display and a speaker. A request from the user is received via the input device, and the processed result is output to the user via the output device.

In the interface 104, for example, a communication interface may be connected to a file server, and the information processing device 10 may acquire information to be analyzed from the file server and output an analysis result to the file server. The file server and the information processing device 10 may be provided in the same intranet or the like connected by a local area network (LAN). In this case, the input of the information and the output of the analysis result of the information processing device 10 may be referred to, for example, from a closed space in a company or the like, and the information may not flow to the outside.

The server 20 provides a program necessary for operation in response to a request from the information processing device 10. The information processing device 10 executes information processing in the information processing device 10 using the program provided from the server 20. Furthermore, as another example, information processing may be executed on a server side. In this case, data to be processed may be transmitted from the information processing device 10 to the server 20, or a place where the data exists may be transmitted to the server 20, and the server 20 may automatically acquire the data to be processed from the information of the place.

First Embodiment

Next, processing in the information processing system 1 will be described. First, extraction of copy and paste in a source code will be described.

Figure 2:
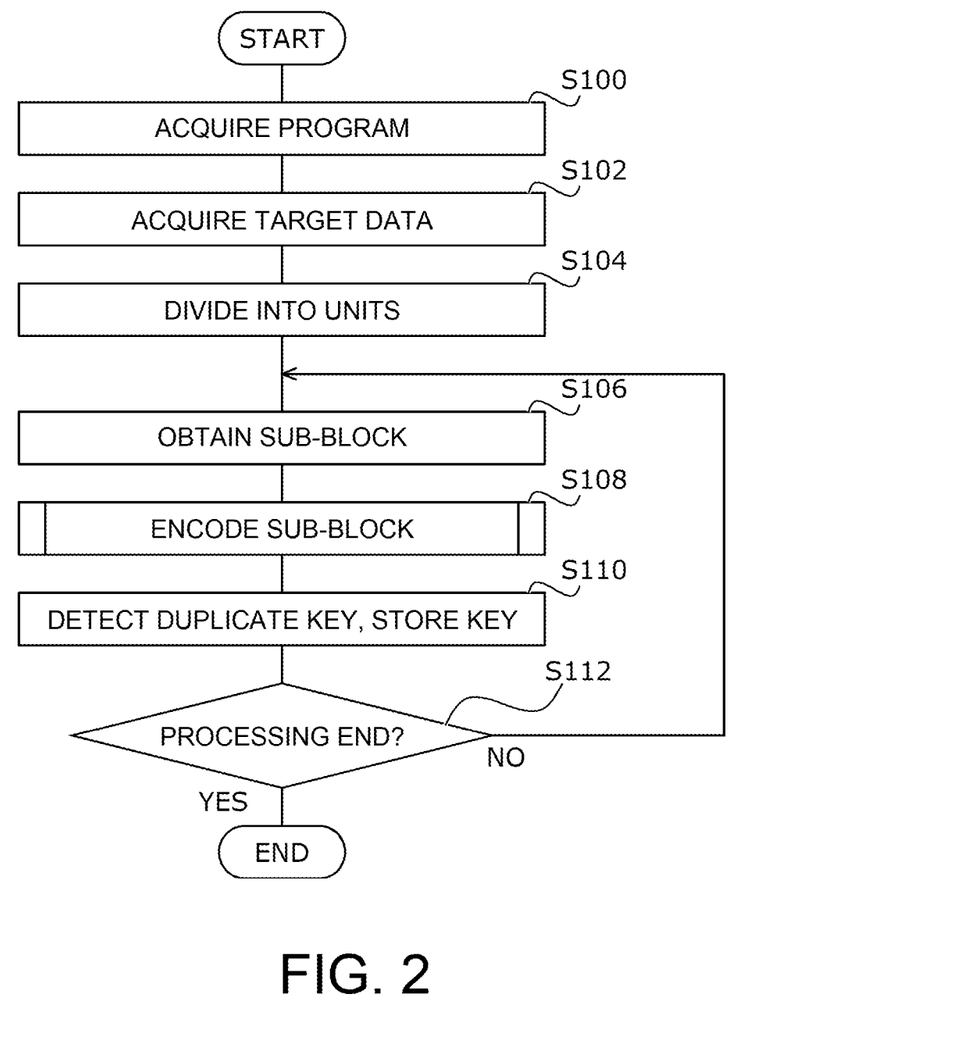
FIG. 2 is a flowchart illustrating an operation of the information processing device according to the embodiment.

FIG. 2 is a flowchart illustrating a flow of processing of the information processing device 10 according to the present embodiment.

First, the information processing device 10 acquires a necessary program from the server 20 (S100). More specifically, the processing circuit 100 acquires necessary information from the server 20 via the interface 104. The processing circuit 100 acquires a program necessary for target analysis from the server 20 using an application, for example, a web browser. The application is not limited to the web browser, and may be a native application. Since the application downloads a program necessary for analysis to a local environment and processes the program, it is possible to process the analysis target in the local user environment. By completing the processing in the local environment, it is possible to avoid the content of the source code from being leaked to the outside.

Next, the processing circuit 100 acquires data to be analyzed (S102). The processing circuit 100 may store analysis target data in the memory 102, for example, and in this case, this step can be omitted. Furthermore, the order of acquisition of this information and acquisition of the program in the previous step can be arbitrarily changed.

As another example, in a case where information may be transmitted to the server 20, an application service provider (ASP) or the like may be used. In this case, data to be analyzed is transmitted from the information processing device 10 to the server 20. As described above, in the case of data stored on a cloud or the like, the server 20 may automatically acquire an analysis target such as a source code by designating an address thereof. According to this example, the step of acquiring the program in S100 can be omitted. For example, in a case where a disclosed source code or the like is analyzed, this method may be adopted to reduce the calculation cost on a client side. In this case, the subsequent processing may be executed by a processing circuit of the server 20, for example.

Next, the processing circuit 100 divides the target data into units by a predetermined identifier (S104). The predetermined identifier may be, for example, Yn (a line feed code in Japanese practice and "Y" can be changed to a backslash if necessary in the present disclosure). When Yn is the predetermined identifier, one row of a source code is recognized as a unit.

The predetermined identifier is not limited thereto, and may be, for example ",". When ";" is the predetermined identifier, for example, in a case where the language of the source code is C or C++, a unit can be set for each instruction. Furthermore, other characters may be used. In this way, an object in any form such as a control character or a character described in ASCII code can be used as the predetermined identifier.

Furthermore, the predetermined identifier may be appropriately set on the basis of a situation such as a language. For example, in some languages, description can be made over a plurality of lines. In such a language, "Yn" is ignored, and unit division by dividing into units for each "Yn" may not be appropriate. Therefore, the unit can be appropriately determined by statements on each programming language.

Figure 3:
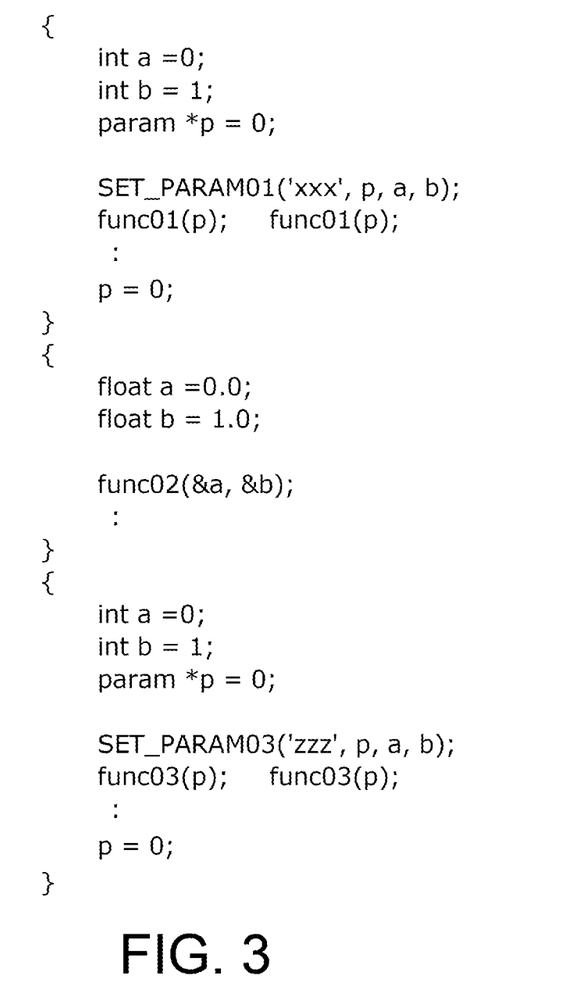
FIG. 3 is a diagram illustrating an example of data to be analyzed according to an embodiment.

FIG. 3 is a diagram illustrating a pseudo code as an example of data to be analyzed. As illustrated in this drawing, for example, the analysis data may be a source code described in a predetermined programming language. In a case where the above-described Yn is the predetermined identifier, the processing circuit 100 divides the target data in units of an instruction group described for each row.

In FIG. 3, when Yn is a predetermined identifier, for example, the target data is divided into units such as {, Ytint a=0;, Ytint b=1;, . . . ("Yt" is a tab code). For example, in a description on line 7, the target data is divided into units such as Ytfunc01(p); Ytfunc01(p). Although the space is a space here, this may also be divided into, for example,   or the like as a control code.

On the other hand, as described above, assuming that ";" is the predetermined identifier, for example, in the description on line 7, it is divided into func01(p), Ytfunc01(p). Since Yt may be unnecessary for semantic analysis depending on the language, it may be deleted at the time of division, or may be deleted at the timing of acquiring a token string to be described later. However, languages in which Yt is also meaningful (for example, python) are handled without being deleted. Note that the same applies to a blank line, and the division may be appropriately performed by deleting or leaving the blank line as it is.

Next, the processing circuit 100 obtains a sub-block (S106). The sub-block is, for example, a set in which units are collected for each first predetermined number. In the example of FIG. 3, assuming that the predetermined identifier is Yn and the first predetermined number is five, {, int a=0;, . . . , (blank line) is obtained as the first sub-block. In this case, as described above, five rows are obtained as sub-blocks. The first predetermined number can be appropriately determined, and may be, for example, 20 or the like, a smaller number, or a larger number. The first predetermined number may be specified by the user via the input interface.

Figure 4:
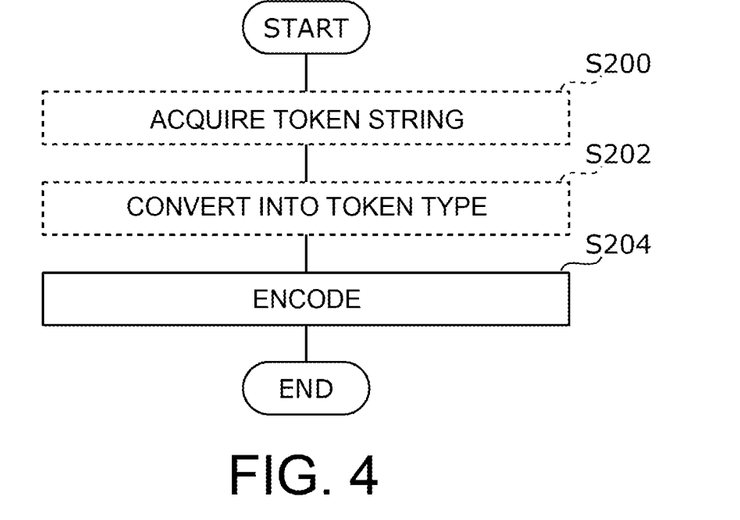
FIG. 4 is a flowchart illustrating an operation of the information processing device according to the embodiment.

Next, the processing circuit 100 encodes this sub-block (S108). FIG. 4 is a flowchart illustrating processing for encoding a sub-block.

First, the processing circuit 100 acquires a token string of a sub-block (S200). For example, in the example of the first sub-block in FIG. 3, token strings of "int", "a", "=", "0", and ";" are acquired. The token strings of the entire sub-block are acquired by executing this process for each unit included in the sub-block.

Next, the processing circuit 100 converts the token string acquired in S200 into a token type (S202). In the above example, the token strings are converted into token types of "raw_identifier", "raw_identifier", "equal", "numeric_constant", and "semi". This conversion does not limit the form of a name or the like after conversion as long as it can be uniquely converted for each type.

The obtained token type may be stored in the memory 102 for each unit. By storing in this manner, in a case where the token type of the sub-block is acquired, the processing can be partially omitted.

Next, the processing circuit 100 encodes the token type of the sub-block acquired in S202 (S204). In this encoding, a code converted by a predetermined function (predetermined conversion) may be output as a code string. For example, the predetermined function is a hash function and the encoded result is a hash value. For example, this hash value is treated as a code.

Note that S200 and S202 described above may be omitted. That is, the processing circuit 100 may calculate the code by converting the text data of the entire sub-block by a predetermined function.

Furthermore, as another example, the code may be calculated by using the text data as it is for a second predetermined number of units at the head of the sub-block, for example, the first two units, and performing the token string acquisition and the token type conversion for the other units. As another example, the second predetermined number of units at the end of the sub-block may be set as text data, and other units may be converted into token types to calculate a code. Note that the second predetermined number is not limited to two, and may be a smaller number or a larger number. Similarly to the first predetermined number, it may be specified by the user.

Figure 5:
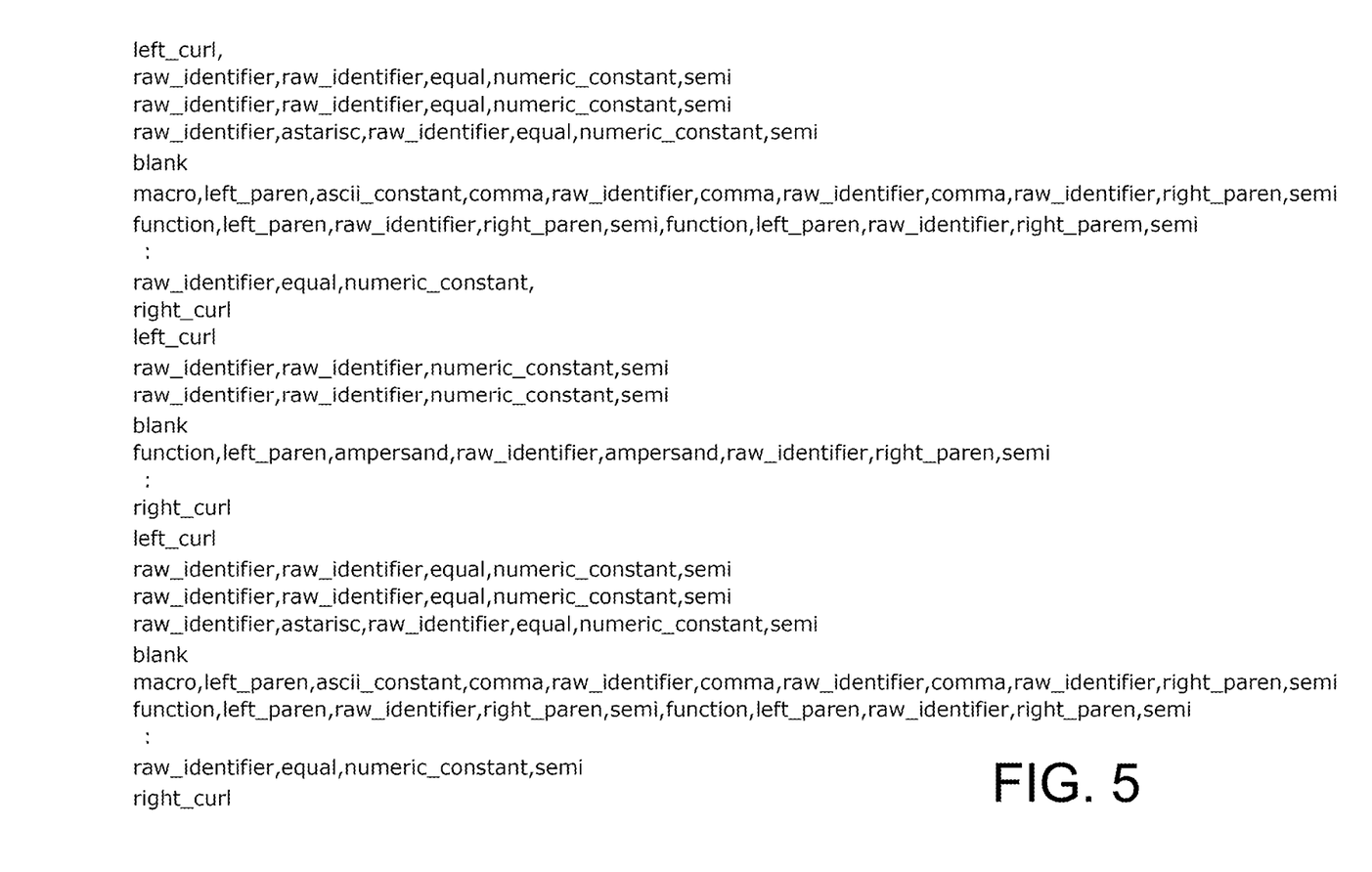
FIG. 5 is a diagram illustrating an example of a token type according to an embodiment.

FIG. 5 illustrates a token type of the source code of FIG. 3. A separator is described with a comma as an example, but is not limited thereto. The separator may be an identifier of another character or the like, or may be in a form without a separator.

In a case where the first predetermined number is five, in the case of FIG. 5, the code is obtained by substituting the first sub-block into a predetermined function, including from the unit of the first left_curl to the unit of blank.

Returning to FIG. 2, next, the processing circuit 100 uses this code as a key to detect, for example, whether or not it is a duplicate of a key already stored in the memory 102 (S110). In a case where the acquired key is already stored in the memory 102, it is determined that a string of the hash type, a string of the text data, or a string of the mixture of the text data and the hash type having the same content as the sub-block (for example, the first sub-block) is already stored and the key is detected as a duplicate portion. In a case where the duplicate key is not detected, the key is stored in the memory 102.

This detection and storage may be performed using, for example, a database. In this case, the processing circuit 100 attempts registration to the database using the encoded string as a unique key. When the encoded string can be registered in the database, it is determined that there is no duplicate sub-block in the portion analyzed up to the present. On the other hand, in a case where the registration to the database is rejected as a unique index error, it is determined that duplicate sub-blocks are already registered, and it is determined that there are duplicate sub-blocks.

In a case where a duplicate portion is detected, the processing circuit 100 may output the duplicate portion, or may store a position (for example, information such as the number of rows and an address) in units of the duplicate portion in the memory 102.

When determining that the processing has ended (S112: YES), the processing circuit 100 outputs, for example, information regarding the position information of the duplicate portion and ends the processing.

On the other hand, when it is determined that the processing has not been completed (S112: NO), the sub-block is updated, and the processing from S106 is repeated. In the example of FIG. 3, the sub-block is updated with the unit from int a=0, which is the unit next to the head of the first sub-block, to SET_PARAM01 ('XXX', p, a, b): as a second sub-block. Then, the similar processing is repeated for the second sub-block.

The end of the processing is determined, for example, by setting sub-blocks for all the units and whether or not the operation has been completed. More specifically, in the example of FIG. 3, the determination is made based on whether or not the processing up to the sub-block (However, the sub-block including the last row at the end is set as the last sub-block.) with all the rows at the head is completed.

In the above example, the processing is started from the unit at the head of FIG. 3, but the present invention is not limited thereto, and conversely, the processing may be executed in a reverse order with the first predetermined number of units from the end as sub-blocks. Furthermore, the processing may be started from a unit in the middle. These processing may be executed in ascending order or descending order in a case where the units are arranged in order.

Note that the sub-block processing may be executed for each appropriate block. For example, in the example of FIG. 3, "{Yn" to "}Yn" may be set as one block, and may be set as a sub-block so as not to exceed the block. That is, the last sub-block may be set in a row in which the final unit is p=0Yn. By analyzing in this manner, it is possible to extract whether or not there is copy and paste for each block. The identifiers of the start and end of the block may also be determined in advance or may be set by the user. In a case where it is determined in advance, the identifiers of the start and end of the block may be automatically switched depending on the language.

Figure 6:
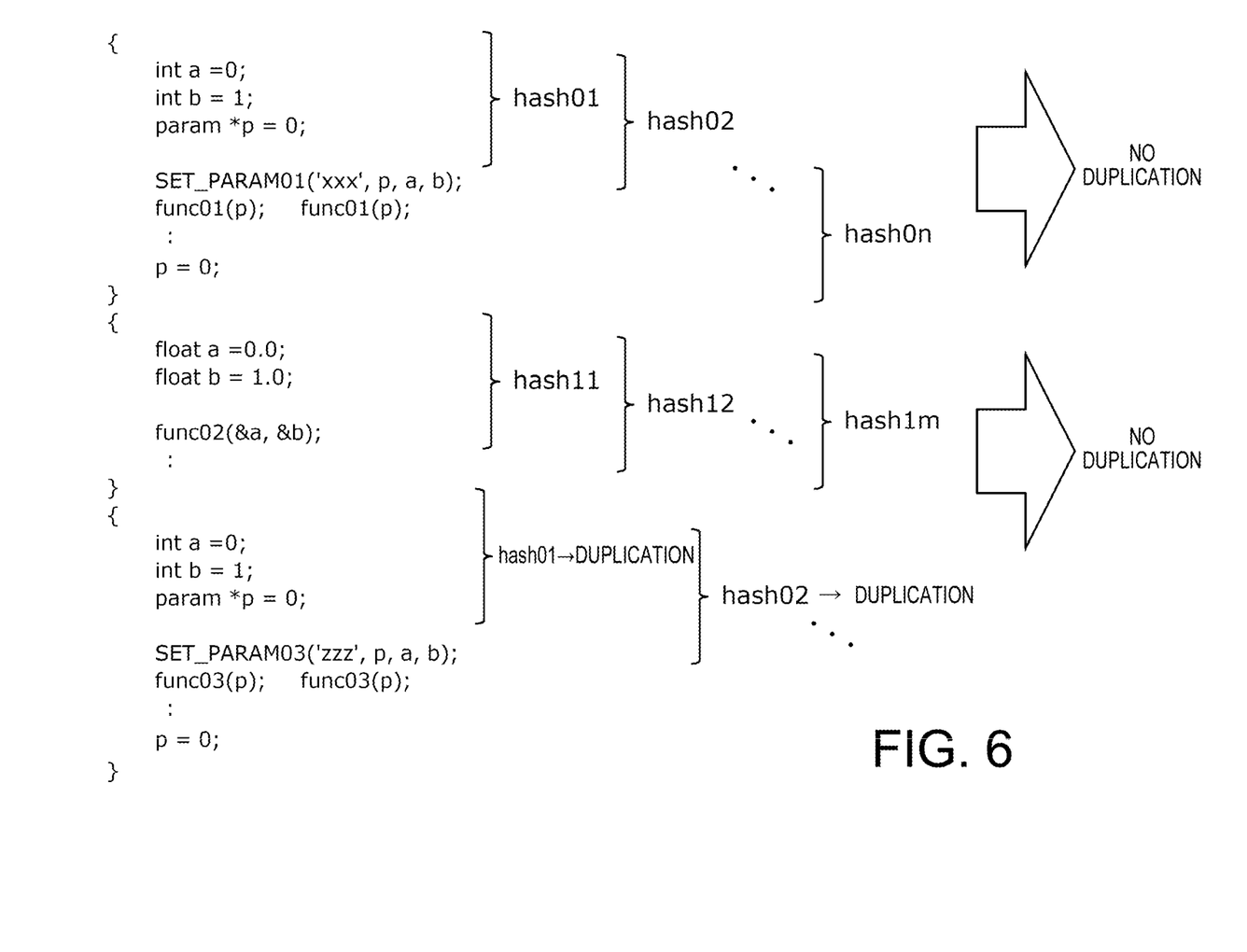
FIGS. 6 and 7 are diagrams illustrating an example of a duplicate state according to an embodiment.

FIG. 6 is a diagram illustrating a state of duplication in a case where the above processing is performed. For example, assuming that a portion surrounded by { } is a first block, a second block, and a third block, since the first block is a first block, the key of each sub-block is stored in the memory 102 as having no duplication.

Also for the second block, since there is no duplicate portion, the key of each sub-block is stored in the memory 102 as having no duplication.

With respect to the third block, since the acquired token type is similar to that of the first block, each sub-block is detected as a duplicate portion. Although the first block and the third block are different as raw text data, the token string is acquired and converted into the token type as in the present embodiment, so that it is determined that the first block and the third block are the same data string, and the first block and the third block can be detected as duplicate portions where copy and paste may have been executed.

As described above, according to the present embodiment, even in portions having different contents, it is possible to detect a portion having a similar configuration as a portion having a possibility of being copied and pasted.

As another example, as described above, it is also possible to omit S200 and S202 in FIG. 4, and in this case, a completely coincident portion can be detected as a copied and pasted portion.

Each of these detection processing increases depending on the number of sub-blocks. That is, although the number of hash strings included in the unit increases or decreases, in principle, when a linear order with respect to the number of sub-blocks, that is, (the number of sub-blocks)=(the number of units) is n, copy and paste can be detected with a calculation amount of O(n). As a result, according to the present embodiment, it is possible to realize high-speed detection of a duplicate portion.

As described above, this processing can be executed not only on the server side but also in a client environment such as a web browser without transmitting data to be analyzed to the server side. Also in this case, since the processing can be executed at the calculation cost of O(n), the processing can be sufficiently performed even by a client which is generally not suitable for the operation at a higher cost than the server. As described above, the processing can be executed without any problem in the client without transmitting data from the client to the outside, which leads to improvement of security.

Modified Example

As described above, the first second predetermined number of rows may be encoded without being converted into the token type. In such a case, for example, the first block and the third block are detected as duplicate portions up to the row of SET_PARAM01( . . . ), but are not detected as duplicate portions in the sub-block having the row of SET_PARAM01( . . . ) as a head. Furthermore, the same applies to a sub-block with the next row at the head. For this reason, up to these lines are duplicated, but it is also possible to determine that these lines are not duplicated.

Figure 7:
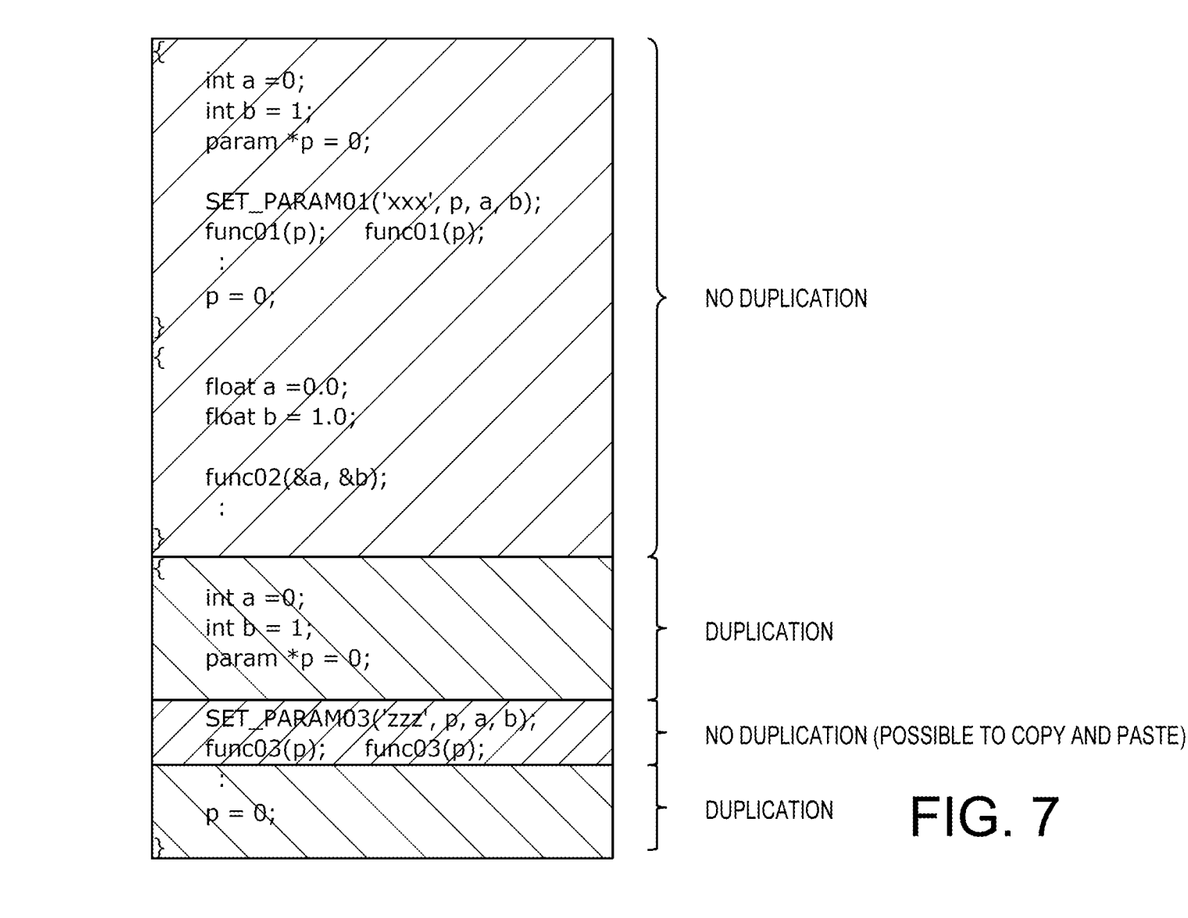

As described above, by encoding the units of the second predetermined number without converting the units into the token type, it is possible to output the duplicate portion with finer granularity:

FIG. 7 is a diagram illustrating an output example in which the units of the second predetermined number are not converted into the token type. In the drawing, an oblique line rising to the right indicates a portion having no duplication, and an oblique line rising to the left indicates a duplicate portion. By not converting the second predetermined number of rows into the token type with respect to the sub-block having each row as the head, as illustrated in FIG. 7, in a case where a non-duplicate portion is included in the middle, the duplicate portion and the non-duplicate portion can be more clearly divided.

Furthermore, in a case where there is a non-duplicate unit sandwiched between the duplicate portions with respect to the unit of the third predetermined number (as a non-limiting example, two.), the portion may be output as a portion having a possibility of copy and paste as illustrated in the drawing.

In this example, the unit of the second predetermined number at the head is used, but as described above, the unit of the second predetermined number at the end may be used. Furthermore, as another example, the second predetermined number of units in a middle that is not the head or the end may be used as raw data, and other units may be converted into a hash type and coded.

The above-described processing is executed in the application on the client side, but the advertisement may be output to the application. Based on the request from the server 20, the processing circuit 100 may output the advertisement to the application at at least one timing before, during, and after the analysis processing.

The server 20 may store the information of the advertisement or may store the correspondence of the user to the advertisement. It is also possible to form a revenue model based on information indicating that the advertisement has been output, or information indicating that, for example, the user has accessed the website of the advertiser from the advertisement.

Second Embodiment

First, extraction of a clone pair in a source code will be described. The clone pair refers to blocks having the same description in different blocks in the source code, or a set of blocks obtained by modifying the same description. In a case where the correction has been made, for example, blocks having the same description at a predetermined ratio or more may be used. Here, the predetermined ratio may be, for example, 80% or the like, but is not limited thereto, and may be a smaller value such as 60% or a larger value such as 95%. The value may be changed by a project, a file, or the like. Furthermore, the source code for extracting the clone pair may be a source code existing in the same file or a source code existing in a different file.

In the present embodiment, processing of extracting a clone pair is executed by performing processing similar to the method of FIG. 2 shown in the first embodiment. For example, as in the above-described embodiment, a portion having a similar configuration can be detected as a portion having a possibility of being copied and pasted even in a portion having different contents. However, the information processing system 1 extracts the detected portion as a clone pair. Similarly, for the unit of a third predetermined number, in a case where there is a non-duplicate unit sandwiched between the duplicate portions, the information processing system 1 can also output the portion as a clone pair.

The information processing system 1 extracts a clone pair in the source code of the project as described above. In the project, the source code is updated daily by one or a plurality of users. Along with this, the number of extracted clonal pairs may increase or decrease as described above.

Figure 8:
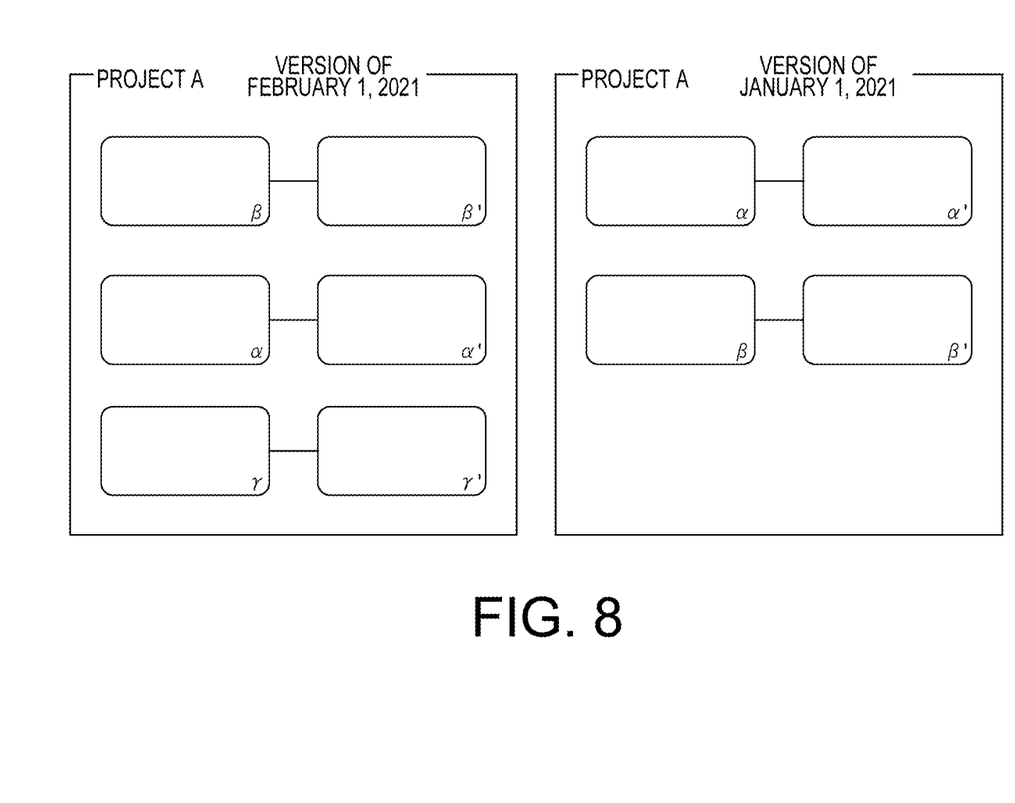
FIG. 8 is a diagram schematically illustrating an example in which the number of clone pairs increases in a project.

FIG. 8 is a schematic diagram of an example in which the number of clone pairs increases in a certain project A. For example, a clone pair of the project on Jan. 1, 2021 and the project on Feb. 1, 2021 is illustrated. Hereinafter, the version of Feb. 1, 2021 will be referred to as a first source code, and the version of Jan. 1, 2021 will be referred to as a second source code. Note that the information regarding the extracted clone pair as described above may be recorded as the project information.

As illustrated in the drawing, it is assumed that there are clone pairs a and B in the second source code, and there are clone pairs a, B, and y in the first source code. First, in the information processing system 1, it is determined to which clone pair in the second source code the clone pair in the first source code corresponds. Similarly to the first embodiment, these processing and the following processing may be processed by either the information processing device 10 or the server 20, or may be processed in cooperation.

The information processing system 1 executes association of the clone pairs between the first source code and the second source code by processing similar to extraction of a clone pair in a project. For example, the information processing system 1 is executed by extracting a block corresponding to the source code of the second source code using a block and a sub-block of the source code of the first source code.

Similarly to the extraction processing of the clone pair described above, this processing is executed by encoding each of the sub-block in the first source code and the sub-block in the second source code, for example. However, the source code to be processed is different from the source code of the same version (revision) in that the source code extends over the first source code and the second source code.

Figure 9:
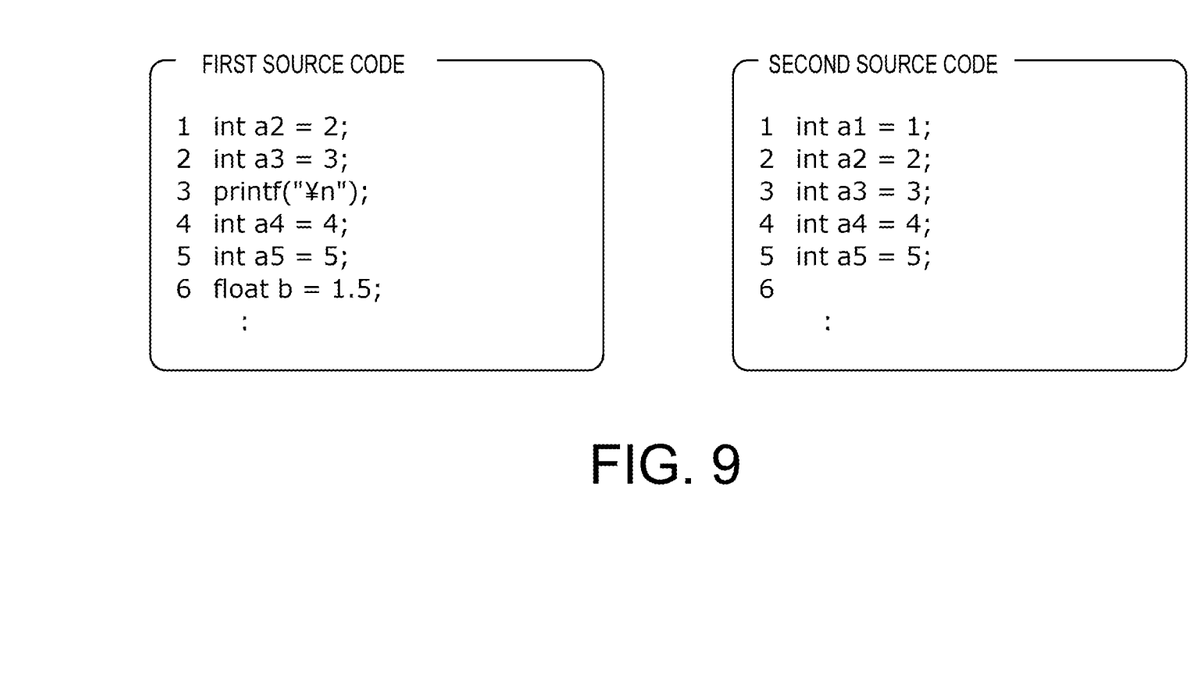
FIG. 9 is a diagram illustrating an example of comparison according to an embodiment.

FIG. 9 is a diagram illustrating a more detailed example. For example, in the first source code and the second source code, there are descriptions as illustrated in the drawing. The leftmost number in the source code is a numerical value representing a line number for description and is not included in the source code. In the second source code, the described portion is a block recorded in the second source code as a clone pair.

The first line in the second source code is deleted, and the third line and the sixth line in the first source code are added.

In such a case, for example, by obtaining the hash value after conversion into the token in units of one row; it is extracted by executing the above processing that the first line and the second line of the first source code correspond to the second line and the third line of the second source code, and the fourth line and the fifth line of the first source code correspond to the fourth line and the fifth line of the second source code. Note that although the hash value is obtained after conversion into the token in the above description, the hash value may be obtained without conversion into the token in order to detect a strict match. In either case, the calculated hash value may be registered in the database to detect duplication, or the hash values may be compared by another method.

Since the third and sixth lines of the first source code have no matching hash in the second source code, the information processing system 1 determines that these lines are added. As described above, in a case where a matching degree in the blocks is greater than or equal to a predetermined ratio, these blocks are determined to be the same block edited.

According to such determination, even in a case where there is deletion or addition of a statement in the source code, if other statements sufficiently match, it can be determined as a corresponding code block. In a case where there is a plurality of candidates of the corresponding code block and there is no difference in the matching degree, in the new and old source codes, a code block having a closer start line may be adopted as the corresponding code block.

In this manner, the information processing system 1 associates the combination of the clone pair in the new version with the clone pair in the old version. That is, by applying the comparison of the blocks in the same project described in the above form to the source codes of other versions of the project, the clone pairs in the new and old versions are associated with each other.

As described above, according to the present embodiment, it is possible to extract the corresponding clone pair in the source code in the same project having different time stamps. The extraction of the clone pair can be appropriately associated with the clone pair of the old project and the clone pair of the new project even in a case where the progress is made in the project and the number of clone pairs further increases as illustrated in the drawing by applying the extraction to the following processing.

Furthermore, the present invention is not limited to detecting a pair in the old project and the new project, and it is possible to detect a duplicate description or a similar description in another source code by the detection method according to the present embodiment. By applying this form to, for example, a licensed source code such as a GPL license and a code of a target project, it is also possible to check, for example, whether or not there is a description that cites another source code in the source code of the project in progress. The citation herein includes an exact match or a partial match and a similar code. This can be detected by converting the description into a token.

As another example, it is possible to detect a problem that description of own code is included in open source code of another company.

In this way, it can also be used to investigate copyright infringement, such as the inclusion of certain open source code in proprietary software, the inclusion of one's own code in someone else's code, or conversely, the inclusion of another person's code in one's own code.

By performing such processing, the clone pairs in the old and new projects illustrated in FIG. 8 are associated. Subsequently, the information processing system 1 may determine whether there is no omission of correction between the clone pairs.

Figure 10:
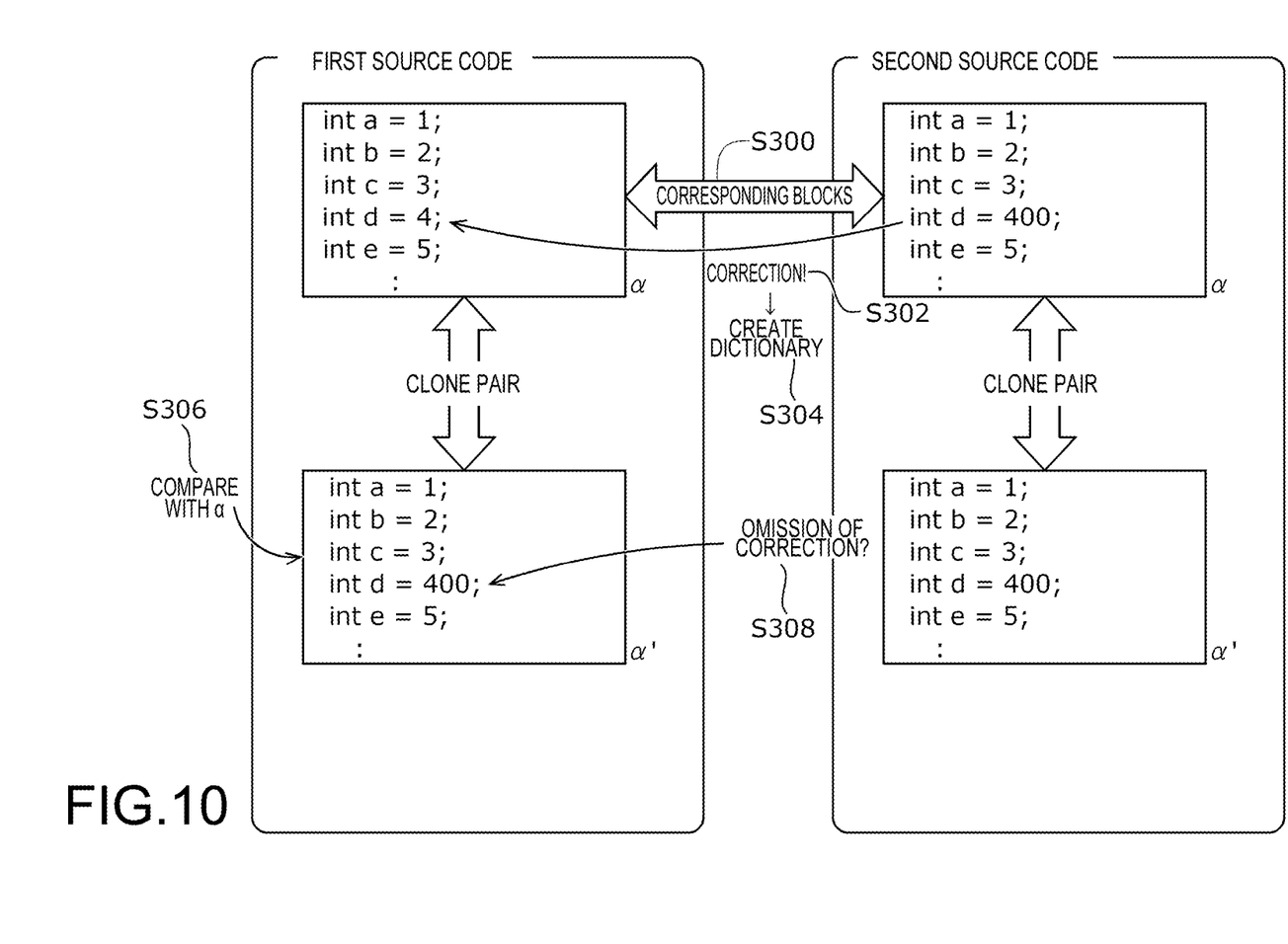
FIG. 10 is a diagram schematically illustrating an example of detection according to an embodiment.

FIG. 10 is a diagram illustrating a clone pair in the first source code and the second source code. As illustrated in this drawing, a clone pair a-a' exists in each source code, and a block a of the first source code and a block a of the second source code are extracted as corresponding code blocks. Furthermore, FIG. 10 illustrates processing steps.

First, the information processing system 1 detects corresponding code blocks between the first source code and the second source code (S300). The detection of the corresponding code blocks is performed by the above processing.

Next, the information processing system 1 compares the corresponding source codes to determine whether or not there is a correction, and extracts a correction portion in a case where there is a correction (S302). By comparing the block a of the first source code with the block a of the second source code, the information processing system 1 can find that the line of "int d=400;" is corrected to "int d=4;". The information processing system 1 obtains, for example, a hash value of a description for each row in a corresponding block, and compares the hash values in the same manner as described above, thereby extracting rows having different descriptions.

Next, the information processing system 1 creates a change dictionary related to the correction on the basis of text information of different rows of this description (S304). The change dictionary is a dictionary that associates the correction information, and for example, in a case where "int d=400;" is corrected to "int d=4;", the change dictionary may include information indicating that "400" is changed to "4". The present invention is not limited thereto, and information of a corrected row ("int d=400;" is changed to "int d=4;") may be registered in a dictionary. Furthermore, the row number of the correction portion in the code block may be registered in the dictionary in association with each other.

Next, in a case where a correction is detected between the corresponding blocks in the first source code and the second source code, the information processing system 1 detects whether or not a similar change is made to the clone pair of the corresponding block of the first source code (S306). The information processing system 1 compares the code block a and the code block a' to determine whether or not the correction is reflected. This determination is performed using the change dictionary. For example, the information processing system 1 extracts information that matches information before correction of the change dictionary.

Here, since there is a row that coincides with "int d=400;" which is the information before correction, the information processing system 1 extracts this information and detects a row (or a sub-block) that is not corrected in the code block a' although it is corrected in the code block a which is the clone pair. In a case where the information regarding a position in the block is associated as the information of the change dictionary, it may be detected whether or not similar correction is performed by the change dictionary around the position in the block forming the clone pair.

In a case where there is a row (sub-block) coincident with the information before correction in the change dictionary, the information processing system 1 determines that there is a possibility that this portion is an omission of correction (S308). The information processing system 1 appropriately stores this portion as a correction omission candidate or appropriately outputs the portion to the user.

As described above, according to the present embodiment, in a project with a different version, a clone pair corresponding to a clone pair in an old version is detected in a new version, and in a case where there is a correction portion in any code block constituting the clone pair and information before correction is left in another code block, it is possible to detect a possibility of omission of correction of the source code in this portion.

In refining the source code, similar modifications are often to be made in the clone pair. According to the information processing system 1 according to the present embodiment, it is possible to reduce the possibility of omission of correction in the portion to be subjected to such correction. This makes it possible to reduce the occurrence of bugs and to reduce the cost of checking by visual recognition of the user, and the like.

Note that the information processing system 1 may include or use, for example, a version management system. This version control system may be a general system such as Git, Mercurial, Subversion, or the like, or may be a system specific system. In this case, if a difference between the source codes is recorded by the version management system, the information processing system 1 may perform registration in the change dictionary in the code block on the basis of the difference information.

Furthermore, similarly, in the code block of the clone pair, the difference information is compared with the dictionary information, and for example, in a case where there is a correction in the code block a and there is no similar correction difference although there is a portion registered in the dictionary, it may be determined that there is a possibility of correction omission.

The above-described processing is executed in the application on the client side, but the advertisement may be output to the application. Based on the request from the server 20, the processing circuit 100 may output the advertisement to the application at at least one timing before, during, and after the analysis processing.

The server 20 may store the information of the advertisement or may store the correspondence of the user to the advertisement. It is also possible to form a revenue model based on information indicating that the advertisement has been output, or information indicating that, for example, the user has accessed the website of the advertiser from the advertisement.

Aspects of the present disclosure are not limited to the above-described embodiments, but include various conceivable modifications, and the effects of the present disclosure are not limited to the above-described contents. The components in each embodiment may be appropriately combined and applied. That is, various additions, modifications, and partial deletions can be made without departing from the conceptual idea and gist of the present disclosure derived from the contents defined in the claims and equivalents thereof.

For example, in the above description, the analysis target is the source code, but the analysis target is not limited thereto, and may be a text file. As some non-limiting examples, it is possible to similarly extract a copy & paste portion for a problem report, a copy & paste of various manuals, and other documents. Furthermore, this can also be used for a binary file regardless of a text file. In these cases, the predetermined identifier and the like described above may be arbitrarily and appropriately set.

What is claimed is:

1. An information processing device comprising one or more processors configured to:
   divide targets into a plurality of units for each predetermined identifier;
   define a set of a first predetermined number of said units as a sub-block from each of the units for the plurality of units;
   encode the sub-block by predetermined conversion, and obtain a code; and
   use the code as a key, and detect existence of another sub-block having identical content with the sub-block corresponding to the code when duplication of the key is detected,
   wherein the targets are text data, and the one or more processors are configured to obtain a token string for the targets, discriminate a type of each of elements of the token string to convert the token string into the type, and calculate the code using the converted token string.

2. The information processing device according to claim 1, wherein
   the predetermined conversion is conversion by a hash function, and
   the code is a hash value.

3. The information processing device according to claim 1, wherein the one or more processors are configured to:
   store the code as a unique key by registering the code in a database, and
   detect existence of another sub-block having identical content with the sub-block corresponding to the code when a request to store the key is made to the database and a unique index error occurs in response to the request to store.

4. The information processing device according to claim 1, wherein the one or more processors are further configured to:
change the sub-block for each of the units in ascending order or descending order, and
repeatedly execute processing for the changed sub-block.

5. The information processing device according to claim 1, wherein the text data is data in which a source code is described.

6. The information processing device according to claim 1, wherein the one or more processors are configured to encode a second predetermined number of the units at a head, an end, or a middle of the sub-block without converting the units into the token type.

7. The information processing device according to claim 1, wherein the one or more processors are provided in a client and execute processing without transmitting information to an outside.

8. The information processing device according to claim 1, wherein the one or more processors are configured to:
detect, in a first source code that is one of the targets, a second code block that is a clone pair having identical content with a first code block at a predetermined ratio or more,
extract a third code block corresponding to the first code block in a second source code that is another target edited earlier than the first source code, and
detect a possibility of omission of correction in the second code block when the first code block is corrected with respect to the third code block.

9. The information processing device according to claim 8, wherein the one or more processors are configured to:
divide the first code block into a plurality of the sub-blocks,
detect other sub-blocks corresponding to the plurality of sub-blocks of the first code block in the second source code, and
extract a continuous set of the other sub-blocks matching the plurality of sub-blocks of the first code block at a predetermined ratio or more as the third code block.

10. A non-transitory computer-readable medium storing a program that causes one or more processors to execute:
dividing targets into a plurality of units for each predetermined identifier;
defining a set of a first predetermined number of said units as a sub-block from each of the units for the plurality of units;
encoding the sub-block by predetermined conversion, and obtaining a code; and
using the code as a key, and detecting existence of another sub-block having identical content with the sub-block corresponding to the code when duplication of the key is detected,
wherein the targets are text data, and the program causes the one or more processors to execute obtaining a token string for the targets, discriminating a type of each of elements of the token string to convert the token string into the type, and calculating the code using the converted token string.

11. The non-transitory computer-readable medium storing the program according to claim 10, wherein the program causes each of the processors to execute:
detecting, in a first source code that is one of the targets, a second code block that is a clone pair having identical content with a first code block at a predetermined ratio or more,
extracting a third code block corresponding to the first code block in a second source code that is another target edited earlier than the first source code,
creating, when correction is made to the first code block with respect to the third code block, a dictionary based on the correction, and
detecting a possibility of omission of correction in the second code block based on the dictionary.

12. An information processing system comprising:
a server; and
a client connected with the server, comprising one or more processor, the one or more processors are configured to, by program provided from the server, execute, without sending data to the server, processing of:
dividing targets into a plurality of units for each predetermined identifier;
defining a set of a first predetermined number of said units as a sub-block from each of the units for the plurality of units;
encoding the sub-block by predetermined conversion, and obtaining a code; and
using the code as a key, and detecting existence of another sub-block having identical content with the sub-block corresponding to the code when duplication of the key is detected,
wherein the targets are text data, and the program causes the one or more processors to execute obtaining a token string for the targets, discriminating a type of each of elements of the token string to convert the token string into the type, and calculating the code using the converted token string.

13. The information processing system according to claim 12, wherein
the one or more processors detect, in a first source code that is one of the targets, a second code block that is a clone pair having identical content with a first code block at a predetermined ratio or more,
extract a third code block corresponding to the first code block in a second source code that is another target edited earlier than the first source code,
create, when correction is made to the first code block with respect to the third code block, a dictionary based on the correction, and
detect a possibility of omission of correction in the second code block based on the dictionary.

14. The information processing system according to claim 12, wherein
the client executes each processing via an application.

15. An information processing device comprising one or more processors configured to:
divide targets into a plurality of units for each predetermined identifier;
define a set of a first predetermined number of said units as a sub-block from each of the units for the plurality of units;
encode the sub-block by predetermined conversion, and obtain a code; and use the code as a key, and detect existence of another sub-block having identical content with the sub-block corresponding to the code when duplication of the key is detected, wherein the one or more processors are configured to:

detect, in a first source code that is one of the targets, a second code block that is a clone pair having identical content with a first code block at a predetermined ratio or more, extract a third code block corresponding to the first code block in a second source code that is another target edited earlier than the first source code, and detect a possibility of omission of correction in the second code block when the first code block is corrected with respect to the third code block.

16. The information processing device according to claim 15, wherein the one or more processors are configured to:

divide the first code block into a plurality of the sub-blocks, detect other sub-blocks corresponding to the plurality of sub-blocks of the first code block in the second source code, and extract a continuous set of the other sub-blocks matching the plurality of sub-blocks of the first code block at a predetermined ratio or more as the third code block.

17. The information processing device according to claim 15, wherein the one or more processors are configured to:

create, when the correction is made to the first code block with respect to the third code block, a dictionary based on the correction to detect the possibility of omission of correction in the second code block based on the dictionary.

18. A non-transitory computer readable medium storing a program that causes one or more processors to execute:

dividing targets into a plurality of units for each predetermined identifier;

defining a set of a first predetermined number of said units as a sub-block from each of the units for the plurality of units;

encoding the sub-block by predetermined conversion, and obtaining a code; and using the code as a key, and detecting existence of another sub-block having identical content with the sub-block corresponding to the code when duplication of the key is detected, wherein the program causes the one or more processors to execute:

detecting, in a first source code that is one of the targets, a second code block that is a clone pair having identical content with a first code block at a predetermined ratio or more, extracting a third code block corresponding to the first code block in a second source code that is another target edited earlier than the first source code, and detecting a possibility of omission of correction in the second code block when the first code block is corrected with respect to the third code block.

19. An information processing system comprising:

a server; and a client connected with the server, comprising one or more processor, the one or more processors are configured to, by program provided from the server, execute, without sending data to the server, processing of:

dividing targets into a plurality of units for each predetermined identifier;

defining a set of a first predetermined number of said units as a sub-block from each of the units for the plurality of units;

encoding the sub-block by predetermined conversion, and obtaining a code; and using the code as a key, and detecting existence of another sub-block having identical content with the sub-block corresponding to the code when duplication of the key is detected, wherein the program causes the one or more processors to execute:

detecting, in a first source code that is one of the targets, a second code block that is a clone pair having identical content with a first code block at a predetermined ratio or more, extracting a third code block corresponding to the first code block in a second source code that is another target edited earlier than the first source code, and detecting a possibility of omission of correction in the second code block when the first code block is corrected with respect to the third code block.

20. The information processing system according to claim 19, wherein the one or more processors are configured to:

create, when the correction is made to the first code block with respect to the third code block, a dictionary based on the correction to detect the possibility of omission of correction in the second code block based on the dictionary.

* * * * *